United States Patent [19]

Imai et al.

[11] Patent Number: 4,962,479
[45] Date of Patent: Oct. 9, 1990

[54] OPTICAL DATA STORAGE SYSTEM WITH WAVELENGTH SELECTIVE LAMINATE

[75] Inventors: Hitoshi Imai; Kazuo Okada, both of Amagasaki, Japan

[73] Assignee: Mitsubishi Denki Kabushiki Kaisha, Tokyo, Japan

[21] Appl. No.: 195,759

[22] Filed: May 19, 1988

[30] Foreign Application Priority Data

May 20, 1987 [JP] Japan .................................. 62-124661

[51] Int. Cl.$^5$ ........................................... G11C 13/04
[52] U.S. Cl. ..................................... 365/119; 365/106
[58] Field of Search ....................... 358/344, 345, 347; 346/76 R, 76 L, 135.1; 369/108, 109, 100, 121; 365/106, 119, 215, 47, 112

[56] References Cited

U.S. PATENT DOCUMENTS

| | | | |
|---|---|---|---|
| 3,896,420 | 7/1975 | Szabo | 365/119 |
| 4,101,976 | 7/1978 | Castro et al. | 365/119 |
| 4,158,890 | 6/1979 | Burland | 365/119 |
| 4,459,682 | 7/1984 | Mossberg | 365/119 |

Primary Examiner—Robert L. Richardson
Attorney, Agent, or Firm—Sughrue, Mion, Zinn, Macpeak & Seas

[57] ABSTRACT

The storage medium for an optical data storage system is a contiguous laminate formed by a plurality of layers of photochemical hole burning material, such layers individually exhibiting inhomogeneous absorption spectrum characteristics spanning different, successive wavelength ranges. This arrangement greatly expands the cumulative or overall absorption band of the storage medium available for laser hole burning to implement data bit writing, and thus increases the storage density at each memory site.

6 Claims, 2 Drawing Sheets

OPTICAL DATA STORAGE SYSTEM WITH WAVELENGTH SELECTIVE LAMINATE

BACKGROUND OF THE INVENTION

This invention relates to an optical data storage system utilizing a laminate of materials, each exhibiting a different inhomogenous absorption spectrum characteristic, as the storage medium such that each layer of the laminate is responsive to a different wavelength range in a hole burning mode of storage.

U.S. Pat. No. 4,101,976 to Castro et al discloses an optical data storage system that utilizes the frequency or wavelength dimension with a storage material of this type. FIG. 1 shows a system similar to that of Castro et al, wherein the emission wavelength and intensity of a laser 10 are controlled by a scanner 11 in a well known manner. The divergent beam emitted by the laser is collimated by a lens 12 whose parallel beam output is passed through a conventional optical deflector 13 and focused by an objective lens 14 on an addressed memory site or element 16 of a storage medium 15 which exhibits an inhomogenous absorption spectrum as illustrated in FIG. 2A. Storage medium materials of this type are well known in the art, and respond to an incident laser beam of sufficient intensity and within a wavelength range of AB by undergoing an optically induced molecular structural or chemical change by which the addressed site becomes non-absorptive or transparent at the "hole burning" wavelength. Thus, when an addressed memory element 16 of the storage medium 15 is subjected to a focused laser beam of sufficient intensity at the three differently spaced wavelengths as shown by the dotted lines and arrows in FIG. 2A, photoptical holes are burned in the material such that its absorption spectrum exhibits transparency slots or gaps as shown in FIG. 2B. Such gaps or holes correspond to data "1" bits, with data "0" bits being represented by the absence of a hole. Writing is thus implemented by deflecting the focused laser beam to an addressed memory element, scanning its wavelength from A to B, and simultaneously pulsing its intensity at the selected wavelengths to "burn" a 001100100 sequence in the example shown. The storage is essentially permanent, although erasable with some materials, and reading is implemented by similarly scanning the addressed memory element over the wavelength range AB but at a reduced intensity level to prevent any additional hole burning or alteration, which produces a time series output signal from a detector 17 as shown in FIG. 2C.

An obvious limitation with a data storage system of this type is that each memory element can only accommodate a given number of bits as determined by the intrinsic width of the absorption spectrum inhomogeneity and the resolution parameters of the system.

SUMMARY OF THE INVENTION

This limitation is effectively overcome in accordance with the invention by configuring the storage medium as a contiguous laminate of separate storage layers individually exhibiting inhomogenous absorption spectrum characteristics spanning different, successive wavelength ranges. The cumulative absorption band of the storage medium available for laser hole burning at each memory site is thus greatly expanded, which attendantly increases the storage density of the system. The different absorption ranges of the layers are provided by adding different coloring dyes to the base material of each layer.

DETAILED DESCRIPTION OF THE PREFERRED EMBODIMENT

Figure 1:
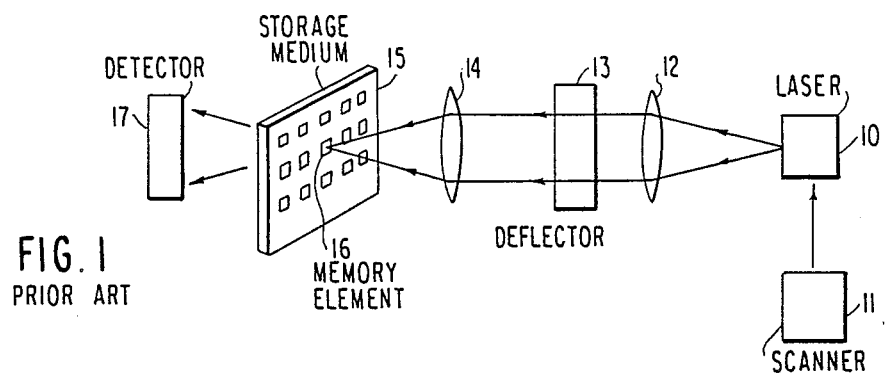
FIG. 1 is a schematic diagram of a conventional optical data storage system.
Figure 2A:
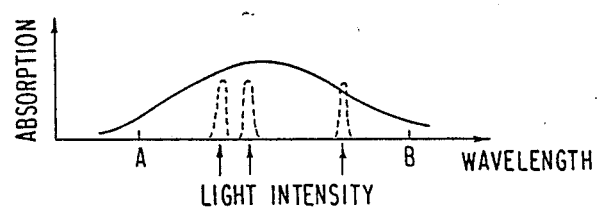
FIGS. 2A, 2B and 2C show absorption spectrum and detector output characteristics for explaining the operation of the system shown in FIG. 1.
Figure 2B:
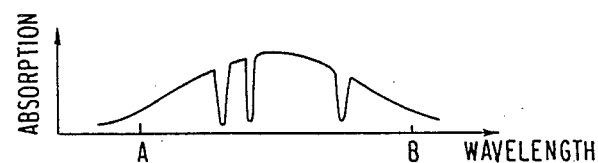
Figure 2C:
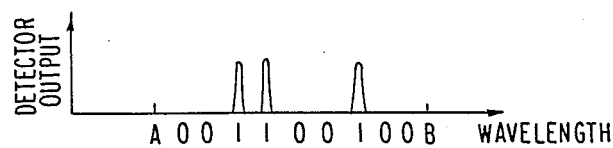
Figure 3:
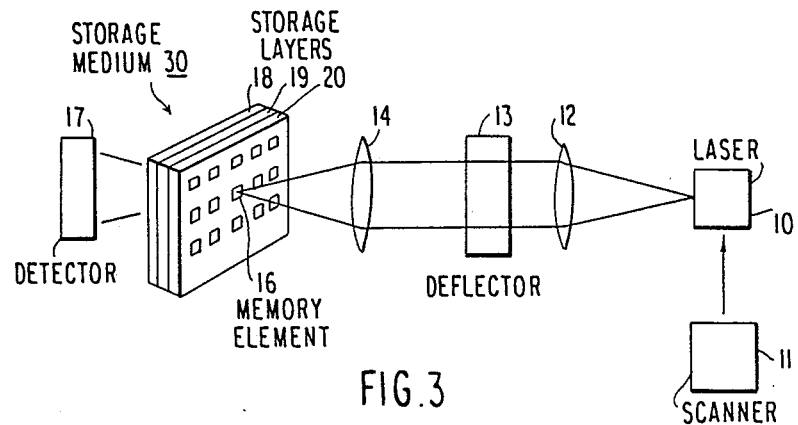
FIG. 3 is a schematic diagram of an optical data storage system embodying a storage medium laminate in accordance with the invention.
Figure 4A:
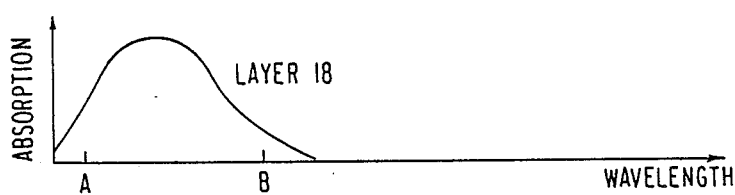
FIGS. 4A through 4F show absorption spectrum and detector output characteristics for explaining the operation of the system of FIG. 3.
Figure 4B:
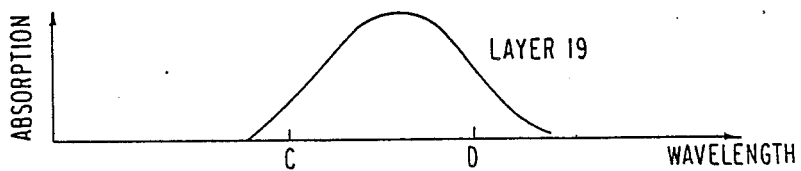
Figure 4C:
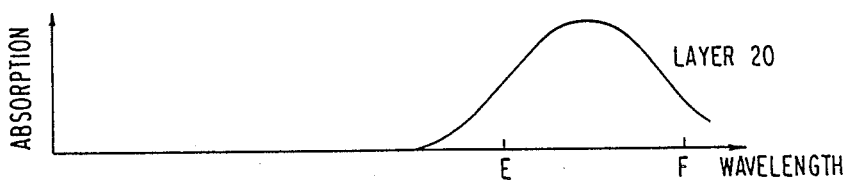

Referring to FIG. 3, wherein the same components shown and described in connection with FIG. 1 are designated by like reference numerals, the overall arrangement is seen to be substantially the same except that the storage medium 30 here comprises, for example, three individual storage layers 18, 19 and 20 of PHB (Photochemical Hole Burning) material such as free-base porphyrin or tetrazine laminated together and each having different absorption spectrum characteristics. Thus, as illustrated in FIGS. 4A, 4B and 4C, storage medium layer 18 exhibits an inhomogenous absorption curve or spectrum extending between wavelengths A and B, the spectrum of layer 19 spans a wavelength range of C to D, and that of layer 20 extends between wavelengths E and F. When the three layers are disposed as a contiguous laminate to define the storage medium 30, their cumulative absorption spectrum appears as shown in FIG. 4D spanning a greatly expanded, in this example essentially tripled, wavelength range from A to F.

Figure 4D:
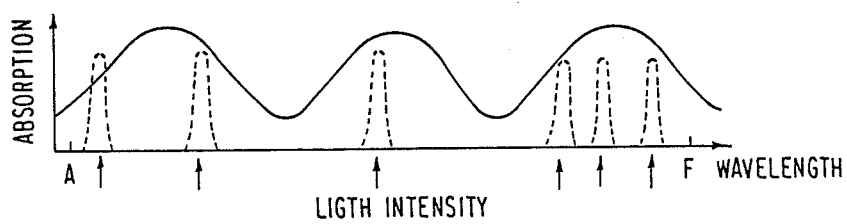
Figure 4E:
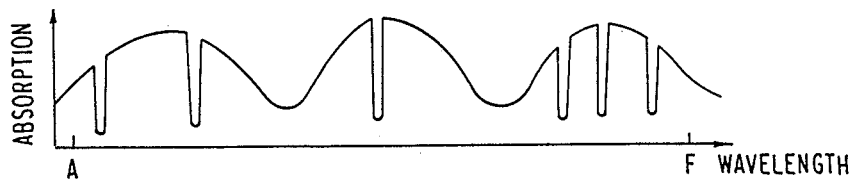

Data can be written into the storage medium laminate in the same manner as described above in connection with FIG. 1, but now the laser 10 is scanned over the enhanced wavelength range AF and selectively pulsed as shown by the dotted lines and arrows in FIG. 4D to burn photoptical holes or transparency slots in the individual layers as illustrated in FIG. 4E. As will be readily appreciated, the storage density at each memory site is thus substantially increased in comparison with the single layer storage medium of the prior art.

Figure 4F:
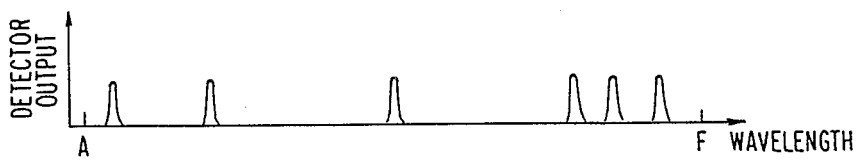

Data readout is also implemented as described above, but again the laser wavelength is scanned over the expanded range AF at each addressed memory element to produce a time sequence or clocked detector output signal as shown in FIG. 4F.

The separate layers 18, 19 and 20 of the storage medium laminate 30 are made of PHB materials containing coloring dyes or ingredients selected from the quinone, naphthoquinone, and anthraquinone groups, which imparts absorption spectrum inhomogeneities occupying different wavelength ranges. The absorption spectrums are essentially controlled or established by providing a dye constituent having a $\pi$ electron system, and/or an electron supplying characteristic, and/or an electron receiving characteristic, as disclosed in Japanese Kokai No. 62-165646, which corresponds to International patent application No. PCT/JP87/00373. Representative anthraquinone dye group derivatives are presented in the following, non-limiting examples.

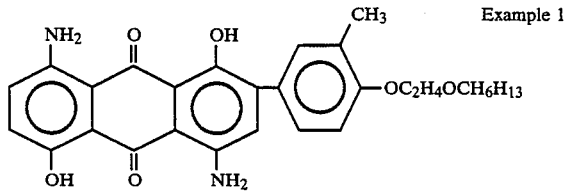

Example 1

The addition of an anthraquinone derivative having the structural formula shown above and comprising amino groups (—NH₂), hydroxy groups (—OH), a benzene ring having an alkyl group (—CH₃) and an alkoxy group (—OC₂H₄OC₆H₁₃) as substituents to a PHB material resulted in a storage medium having an absorption spectrum peak (wavelength B in FIG. 4A) of approximately 645 nm.

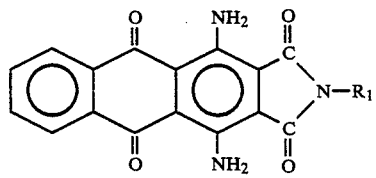

Example 2

The addition of an anthraquinone derivative having the structural formula shown above, where $R_1$ is an alkyl group or an alkoxy group, and comprising amino groups (—NH₂) and a heterocyclic ring wherein two of the carbon atoms in the ring form carbonyl groups (>C=O) as substituents to a PHB material resulted in a storage medium having an absorption spectrum peak (wavelength D in FIG. 4B) of approximately 680 nm.

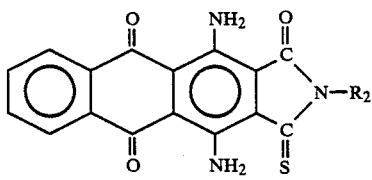

Example 3

The addition of an anthraquinone derivative having the structural formula shown above, where $R_2$ is an alkyl group or an alkoxy group, and comprising amino groups (—NH₂), and a heterocyclic ring wherein one carbon atom of the ring forms a carbonyl group (>C=O) and another forms a thiocarbonyl group (>C=S) as substituents to a PHB material resulted in a storage medium having an absorption spectrum peak (wavelength F in FIG. 4C) of approximately 760 nm.

Although the storage medium 30 is configured as a rectangle and disposed at a fixed position in the embodiment described above, it can instead be configured as a rotating or indexable disc synchronized with the deflector 13 to implement memory element addressing, as a card-like member insertable in an access slot of the data storage system, etc. As will be readily apparent to those skilled in the art, the through transmissive system illustrated can also be configured as a reflective system by mirror coating one side of the storage medium laminate.

What is claimed is:

1. An optical data storage system, comprising:
    (a) a storage medium defined by a plurality of individual layers of photochemical hole burning material disposed as a contiguous laminate, said layers individually exhibiting inhomogenous absorption spectrum characteristics spanning different, successive wavelength ranges, and
    (b) means for subjecting an addressed memory site of the storage medium to a laser beam of sufficient intensity at selected wavelengths within an overall range encompassing said successive ranges to induce photochemical reactions in the storage medium layers such that the addressed memory site is thereafter substantially transparent to light at said selected wavelengths, thereby implementing the writing of data bits in the storage medium layers at the addressed memory site.

2. A system as defined in claim 1, wherein the storage medium layers are planar.

3. A system as defined in claim 2, wherein the photosensitive hole burning material of each layer includes a coloring dye selected from a quinone, naphthoquinone or anthraquinone group, each dye having different substituents.

4. An optical data storage system including a storage medium formed of photosensitive hole burning material exhibiting an inhomogenous absorption spectrum characteristic, and means for subjecting an addressed memory site of the storage medium to a laser beam of sufficient intensity at selected wavelengths within the absorption spectrum to induce photochemical reactions in the storage medium such that the addressed memory site is thereafter substantially transparent to light at said selected wavelengths, thereby implementing the writing of data bits in the storage medium at the addressed memory site, characterized by:
    the storage medium comprising a plurality of individual layers disposed as a contiguous laminate, said layers individually exhibiting inhomogenous absorption spectrum characteristics spanning different, successive wavelength ranges, and wherein said selected wavelengths lie within an overall range encompassing said successive ranges, said successive ranges thus expanding the cumulative absorption band of the storage medium such that the storage density at each memory site is substantially increased.

5. A system as defined in claim 4, wherein the storage medium layers are planar.

6. A system as defined in claim 5, wherein the photosensitive hole burning material of each layer includes a coloring dye selected from a quinone, naphthoquinone or anthraquinone group, each dye having different substituents.

* * * * *